US010009673B1

(12) United States Patent
Liu et al.

(10) Patent No.: US 10,009,673 B1
(45) Date of Patent: Jun. 26, 2018

(54) EFFICIENT CPRI TRANSMISSION

(71) Applicant: Futurewei Technologies, Inc., Plano, TX (US)

(72) Inventors: Xiang Liu, Marlboro, NJ (US); Frank Effenberger, Frisco, TX (US); Huaiyu Zeng, Red Bank, NJ (US); Jiang Qi, Santa Clara, CA (US); Liang Song, Santa Clara, CA (US); Xiao Sun, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days. days.

(21) Appl. No.: 15/706,487

(22) Filed: Sep. 15, 2017

(51) Int. Cl.
*H04J 14/00* (2006.01)
*H04Q 11/00* (2006.01)
*H04J 14/08* (2006.01)
*H04B 10/2575* (2013.01)
*H04J 3/16* (2006.01)

(52) U.S. Cl.
CPC ... *H04Q 11/0067* (2013.01); *H04B 10/25753* (2013.01); *H04J 3/1658* (2013.01); *H04J 14/08* (2013.01); *H04Q 11/0003* (2013.01); *H04Q 2011/0086* (2013.01)

(58) Field of Classification Search
CPC ........ H04B 10/25753; H04B 10/25754; H04B 10/27; H04J 14/08; H04J 3/1658; H04Q 11/0067; H04Q 2011/0064; H04Q 11/0003; H04Q 2011/0086
USPC ...... 398/66, 67, 98, 100, 101, 102, 115, 116
See application file for complete search history.

(56) References Cited

U.S. PATENT DOCUMENTS

| 6,347,096 B1 * | 2/2002 | Profumo | H04J 3/1694 370/442 |
| 7,352,759 B2 * | 4/2008 | Lim | H04J 3/1694 370/395.41 |
| 7,590,139 B2 * | 9/2009 | Boyd | H04Q 11/0067 370/254 |

(Continued)

OTHER PUBLICATIONS

A Novel DBA Scheme for TDM-PON based Mobile Fronthaul Takayoshi Tashiro*, Shigeru Kuwano*, Jun Terada*, Tomoaki Kawamura†, Nobuyuki Tanaka†, Satoshi Shigematsu†, and Naoto Yoshimoto* @2014.*

(Continued)

*Primary Examiner* — Hibret Woldekidan
(74) *Attorney, Agent, or Firm* — Conley Rose, P.C.

(57) ABSTRACT

A method of communication between a base band unit (BBU) and a plurality of remote radio units (RRUs) via a point-to-multipoint time division multiplexing passive optical network (TDM-PON) system is provided. The method can be performed by an ONU and comprises receiving Ethernet packets from the Ethernet interface of an RRU of the plurality of RRUs, performing time-division multiplexing of the Ethernet packets to generate multiplexed packets, storing in a buffer of the ONU the multiplexed packets based on a pre-determined buffer starting time and buffer size, packaging the multiplexed packets in the buffer to fixed length transmission blocks (TBs) having pre-allocated time slots for TDM-PON upstream transmission, and transmitting the TBs to an optical line terminal (OLT) that is communicatively coupled to the BBU such that no contention of TBs occurs at the OLT.

21 Claims, 7 Drawing Sheets

(56) References Cited

U.S. PATENT DOCUMENTS

| | | | | |
|---|---|---|---|---|
| 7,613,112 B2* | 11/2009 | Jyske | H04L 47/10 | 370/230 |
| 8,190,029 B2* | 5/2012 | Ozaki | H04B 10/25754 | 398/100 |
| 9,154,221 B2* | 10/2015 | Hu | H04Q 11/0067 | |
| 9,184,842 B2* | 11/2015 | Dahlfort | H04J 14/0282 | |
| 9,270,406 B2* | 2/2016 | Hirano | H04B 10/272 | |
| 9,602,212 B2* | 3/2017 | Kuwano | H04L 12/2861 | |
| 9,641,373 B2* | 5/2017 | Zeng | H04L 27/2623 | |
| 9,866,347 B2* | 1/2018 | Sarashina | H04B 10/25754 | |
| 2004/0264961 A1* | 12/2004 | Nam | H04Q 11/0067 | 398/58 |
| 2006/0291386 A1* | 12/2006 | Jyske | H04L 47/10 | 370/230 |
| 2007/0140288 A1* | 6/2007 | Boyd | H04Q 11/0067 | 370/442 |
| 2010/0098433 A1* | 4/2010 | Boyd | H04J 3/0658 | 398/155 |
| 2010/0215368 A1* | 8/2010 | Qian | H04J 14/0282 | 398/67 |
| 2012/0087652 A1* | 4/2012 | Horishita | H04L 12/2861 | 398/25 |
| 2012/0087662 A1* | 4/2012 | Suzuki | H04J 3/1694 | 398/66 |
| 2014/0153584 A1* | 6/2014 | Finkelstein | H04L 47/50 | 370/468 |
| 2014/0219651 A1* | 8/2014 | Ruffini | H04J 14/02 | 398/33 |
| 2015/0229397 A1* | 8/2015 | Shibata | H04B 10/25754 | 398/115 |
| 2015/0333834 A1* | 11/2015 | Liu | H04B 10/27 | 398/66 |
| 2017/0250777 A1* | 8/2017 | Sarashina | H04B 10/25754 | |
| 2017/0264387 A1* | 9/2017 | Doo | H04B 10/27 | |
| 2018/0076914 A1* | 3/2018 | Zhou | H04J 3/0667 | |

OTHER PUBLICATIONS

Liu, X., et al., "Emerging Optical Access Network Technologies for 5G Wireless [Invited]," J. Opt. Commun. Netw., vol. 8, No. 12, Dec. 2016, pp. B70-B79.

Tashiro, T., et al., "A Novel DBA Scheme for TDM-PON based Mobile Fronthaul," OFC, 2014, 3 pages.

Kabayashi, T., et al., "Bandwidth Allocation scheme based on Simple Statistical Traffic Analysis for TDM-PON based Mobile Fronthaul," OFC, 2016, 3 pages.

* cited by examiner

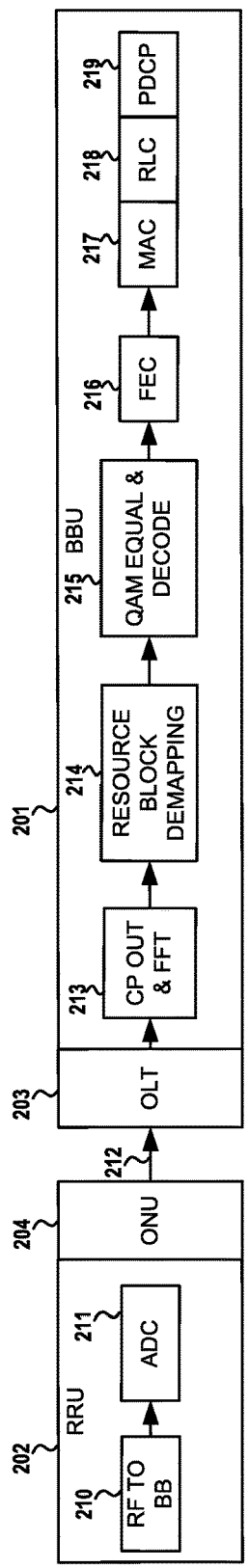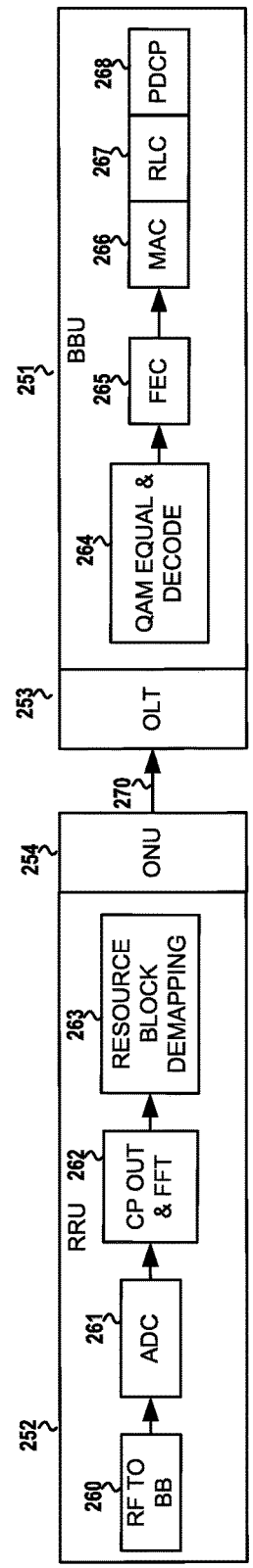
FIG. 2A
FIG. 2B

US 10,009,673 B1

EFFICIENT CPRI TRANSMISSION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cloud radio access network or centralized radio access network (C-RAN) is a centralized, cloud computing-based architecture for radio access networks that supports second generation (2G), third generation (3G), fourth generation (4G), and future wireless communication standards. As the demand for connectivity has exploded, mobile operators have looked for ways to minimize the footprint and cost of their equipment. This has led to centralization of parts of the radio access network (RAN) (i.e., the equipment that connects to cellular antennas, processes the signal, and sends it to the core network). In particular, the baseband processing unit (BBU), which is the part of the RAN, has been moved to a central location from which multiple remote radio heads (RRH) or remote radio units (RRUs) can be served.

SUMMARY

According to one aspect of the present disclosure, there is provided a method, an optical network unit (ONU), and a time division multiplexing-passive optical network (TDM-PON) system for supporting communication between a BBU and a plurality of RRUs. In various embodiments, an ONU coordinates a transmission of Ethernet packets from an Ethernet interface of an RRU to transport blocks (TBs) having pre-allocated time slots for TDM-PON upstream transmission. In one embodiment, the TBs are fixed length. In one embodiment, the ONU performs time-division multiplexing of the Ethernet packets to generate multiplexed packets. The ONU stores the multiplexed packets in a buffer based on a pre-determined buffer starting time and buffer size. In one embodiment, the ONU packages the multiplexed packets in the buffer to the TBs having pre-allocated time slots for TDM-PON upstream transmission by the ONU. In one embodiment, the ONU transmits the TBs to an optical line terminal (OLT) that is communicatively coupled to a BBU such that no contention of TBs occurs at the OLT.

According to a second aspect of the present disclosure, the pre-determined buffer starting time may be set such that at a completion of a first packaged TB, the first packaged TB is transmitted in its pre-allocated time slot with a latency that is much smaller than a TDM-PON cycle period ($T_{cycle}$), e.g., ten times smaller than $T_{cycle}$. In one embodiment, the $T_{cycle}$ may be equal to an RRU symbol period ($T_{sym}$) of an RRU in the plurality of RRUs. For example, in some embodiments, the $T_{cycle}$ may be equal to a largest $T_{sym}$ of the plurality of RRUs.

According to a third aspect of the present disclosure, the pre-determined buffer size may be equal to twice a number of bits of an ONU TB. In some embodiments, the maximum number of bits to be transmitted is equal to a number of bits of an ONU TB.

According to a fourth aspect of the present disclosure, the order of the Ethernet packets are maintained during time-division multiplexing of the Ethernet packets and during storage of the multiplexed packets in the buffer of the ONU. In various embodiments, time-division multiplexing of the Ethernet packets and buffering of the multiplexed packets is performed without any idle bits between the Ethernet packets. In some embodiments, the average size of the Ethernet packets is one order of magnitude smaller than a TDM-PON TB size. In some embodiments, the size of the Ethernet packets is equal in size to Ethernet packets of other RRUs in the plurality of RRUs.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 2A-2B are schematic diagrams illustrating a comparison of traditional physical layer functions and a division of physical layer functions in accordance with various embodiments of the disclosure;

DETAILED DESCRIPTION

Figure 1:
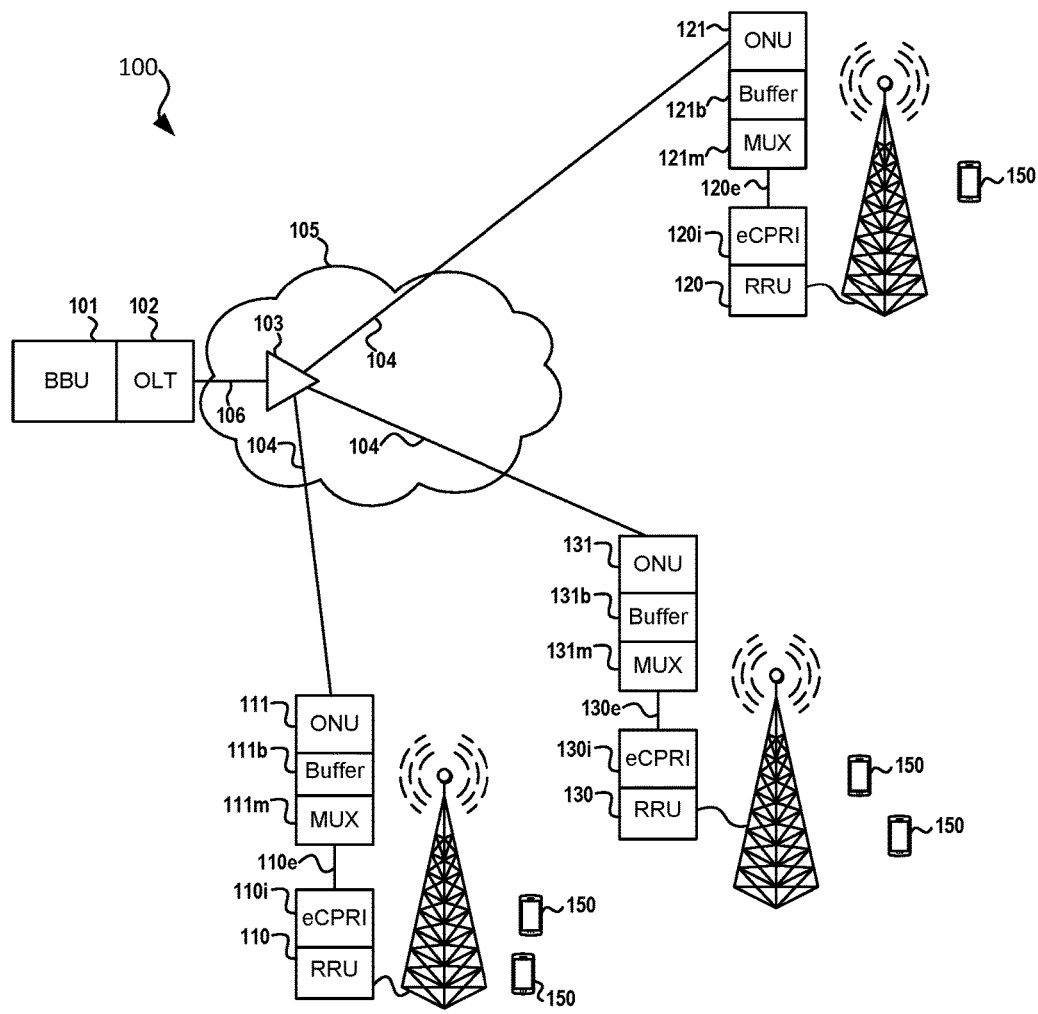
FIG. 1 is a schematic diagram illustrating a C-RAN in accordance with various embodiments of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an", and "the" are intended to include the plural forms as well, unless the context clearly indicates otherwise.

A module as referenced herein may comprise one or more hardware or electrical components such as electrical circuitry, processors, and memory. The memory may be volatile memory or non-volatile memory that stores data such as, but not limited to, computer executable instructions, machine code, and other various forms of data. The module may be configured to use the data to execute one or more instructions to perform one or more tasks.

Also, as referenced herein, the term "communicatively coupled" means capable of sending and/or receiving data over a communication link. In certain embodiments, communication links may also encompass internal communication between various components of a system and/or with an external input/output device such as a keyboard or display device. Additionally, the communication link may include both wired and wireless links, and may be a direct link or may comprise multiple links passing through one or more communication network devices such as, but not limited to, routers, firewalls, servers, and switches. The network device may be located on various types of networks. A network as used herein means a system of electronic devices that are joined together via communication links to enable the exchanging of information and/or the sharing of resources. Non-limiting examples of networks include local-area networks (LANs), wide-area networks (WANs), metropolitan-area networks (MANs), passive optical networks (PONs), and RANs. The networks may include one or more private networks and/or public networks such as the Internet. The networks may employ any type of communication standards and/or protocol.

As described in the background section, in C-RAN, the BBUs have been moved to a central location from which multiple RRUs can be served. Fiber is typically used to connect BBUs to the RRUs at the cell sites, and this connection is often referred to as "fronthaul." Fronthaul has become a crucial segment in C-RAN enabling new wireless technologies such as coordinated multi-point (CoMP) and massive multiple-input multiple-output (MIMO), etc.

In today's mobile fronthaul, common public radio interface (CPRI) is generally used, but it is not bandwidth-efficient. To increase the efficiency, eCPRI is being defined, where the letter "e" may stand for Efficient, Ethernet, and/or Evolved. However, when eCPRI is straightforwardly used with PON, the overall latency due to both mobile-media access control (MAC) and PON-MAC processing will be too large, especially for time-sensitive applications such as fifth generation (5G) RAN (CoMP, MIMO, small-cell deployment, etc.). For instance, a resource block (RB) typically has 5376 bits (12 subcarriers×7 symbols×16 bits/sample×4 Transmitters for 4×4 MIMO). For 10(25) gigabit per second (Gb/s) TDM-PON, the transmission burst ($T_{burst}$) is approximately 500(200) nanosecond (ns). Since the transmission gap (Tgap) is approximately 200 ns (for laser on/off and burst-mode channel tracking), the transmission overhead is as large as approximately 40% of the total transmission, which is too large. For future PON data transfer rates of 50 Gb/s and more, the overhead will be even more.

Accordingly, the disclosed embodiments include a method and an apparatus for low-latency eCPRI transmission using TDM-PON. Various aspects of the disclosed embodiments may include low-latency multiplexing of multiple eCPRI upstream packets into a TDM-PON upstream burst, forward error correction (FEC) protection of each TDM-PON upstream burst, low-latency multiplexing of multiple eCPRI downstream packets into a continuous-mode TDM-PON downstream signal, and FEC protection of each TDM-PON downstream signal. Advantages of the disclosed embodiments may include increased bandwidth efficiency in mobile fronthaul (e.g., by approximately 10×), reduced bandwidth scheduling delay in TDM-PON, and enable highly cost-effective TDM point-to-multipoint mobile fronthaul.

FIG. 1 illustrates a C-RAN 100 in accordance with various embodiments of the disclosure. In the depicted embodiment, the C-RAN 100 comprises a BBU 101, an OLT 102, an RRU 110, an ONU 111, an RRU 120, an ONU 121, an RRU 130, and an ONU 131. In certain embodiments, the BBU 101 and the OLT 102 may be configured as a single device. Similarly, in certain embodiments, the RRUs 110, 120, 130 and their respective ONUs 111, 121, 131 may be configured as a single device. Therefore, unless otherwise indicated, as used herein, any reference to a BBU may include both the BBU as a stand-alone device and the BBU in combination with the OLT. Similarly, unless otherwise indicated, as used herein, any reference to an RRU may include both the RRU as a stand-alone device and the RRU in combination with an ONU. Additionally, although not illustrated in detail, the BBU 101, the OLT 102, and each of the RRUs 110, 120, 130 and their corresponding ONUs 111, 121,131 comprise at least one processing unit or processor or other hardware/circuitry for executing instructions that may be encoded in any form, and one or more data storage component or memory units for storing data and other instructions executed by the device. Additionally, each of the devices may include one or more communication or network interfaces for enabling the device to communicatively couple to another device.

The C-RAN 100 requires reliable, excessive bandwidth, and low latency fronthaul transmission from RRUs 110, 120, 130 to the BBU 101. The BBU 101 and OLT 102 are located at a central location such as a central office. The BBU 101 acts as a digital unit implementing the base station functionality, from baseband processing to packet processing. Baseband refers to the original frequency range of a transmission signal before it is modulated. Although only a single BBU 101 is illustrated, a plurality of BBUs 101 may be located at the central location to form a BBU pool. In some embodiments, the BBUs 101 are linked and can share information, while in others they are simply located in the same location. The OLT 102 is an access node that enables the BBU 101 to communicate over a PON 105.

The RRU 110, RRU 120, and RRU 130 are each located at a base station (such as an evolved node B (eNB), for example) and communicate wirelessly with one or more user equipment (UE) 150*s*. The UE 150 may be any kind of electronic device such as a mobile phone or mobile computing device. In various embodiments, the RRUs 110, 120, 130 are located in close proximity to one and another, and may operate at the same one, or same set of, carrier frequencies.

The RRU 110, RRU 120, and RRU 130 may each include an Ethernet interface. In one embodiment, the Ethernet interface is an eCPRI. For example, in the depicted embodiment, the RRU 110 includes an eCPRI 110*i*, the RRU 120 includes an eCPRI 120*i*, and the RRU 130 includes an eCPRI 130*i*. The eCPRI 110*i* enables the RRU 110 to be communicatively coupled via an Ethernet connection 110e to an ONU 111. The eCPRI 120i enables the RRU 120 to be communicatively coupled via an Ethernet connection 120e to an ONU 121. The eCPRI 130i enables the RRU 130 to be communicatively coupled via an Ethernet connection 130e to an ONU 131.

The ONU 111, ONU 121, and ONU 131 are access nodes that convert electrical signals to optical signals (and vice versa) for enabling communication over a fiber optic line 104 of the PON 105. In various embodiments, each of the ONU 111, ONU 121, and ONU 131 respectively include a buffer and a multiplexer (MUX). For example, in the depicted embodiment, the ONU 111 includes a buffer 111b and a MUX 111m, the ONU 121 includes a buffer 121b and a MUX 121m, the ONU 131 includes a buffer 131b and a MUX 131m. A buffer is a region of a physical memory storage that is used to temporarily store data while it is being moved from one place to another. A multiplexer is a device that selects one of several input signals and forwards the selected input into a single output line. The MUXs 111m, 121m, 131m be used to increase the amount of data that can be sent over the PON 105 within a certain amount of time and bandwidth. The ONU 111, ONU 121, and ONU 131 each respectively enable the RRUs 110, 120, 130 to communicate with the BBU 101 via the PON 105 by establishing a communication link with the OLT 102. The OLT 102 performs a similar function as an ONU, but at the central location for the BBU 101.

As illustrated in FIG. 1, the ONUs 111, 121, 131 are each connected to a multiplexer/demultiplexer 103 via a fiber optic line 104. The multiplexer/demultiplexer 103 is also connected to the BBU 101 via optical line 106. The multiplexer/demultiplexer 103 is configured to split or demultiplex a single optical signal into multiple optical signals for sending the optical signal to the ONUs 111, 121, 131. Additionally, the multiplexer/demultiplexer 103 is configured to combine or multiplex multiple optical signals from the ONUs 111, 121, 131 into a single optical signal for sending the combined optical signal to the BBU 101.

FIG. 2A is a schematic diagram illustrating a functional split in the physical layers between an RRU 202 and a BBU 201 in accordance with a traditional system, using CPRI. The RRU 202 receives a radio frequency (RF) signal, such as from a UE 150, and converts it to an analog baseband (BB) signal at block 210. The RRU 202 then converts the analog BB signal to a digital signal using CPRI encoding at analog to digital converter (ADC) at block 211. The RRU 202 then sends the entire raw data to the BBU 201 via the ONU 204 using digital radio over fiber (DRoF) 212. This is the CPRI splitting point in the traditional system using CPRI.

The BBU 201 receives the raw signal from the RRU 202 via the OLT 203. The BBU 201 removes the cyclic prefix (CP) and performs fast Fourier transform (FFT) at block 213. The term CP refers to the prefixing of a symbol with a repetition of the end. The CP serves as a guard interval and eliminates intersymbol interference from the previous symbol. As a repetition of the end of the symbol, it allows the linear convolution of a frequency-selective multipath channel to be modeled as circular convolution using FFT.

At block 214, the BBU 201 performs resource block demapping to extract the signal of the UE 150. The BBU 201 at block 215 performs quadrature amplitude modulation (QAM) equalization and processed signal decoding. QAM combines two amplitude-modulated (AM) signals into a single channel, thereby doubling the effective bandwidth. At block 216, the BBU 201 performs FEC on the decoded signal. FEC is a method of obtaining error control in data transmission in which the source (transmitter) sends redundant data and the destination (receiver) recognizes only the portion of the data that contains no apparent errors. The signal is then passed from the physical layer (e.g., Long-Term Evolution (LTE) Layer 1) onto the next layer (e.g., LTE Layer 2) which is composed of three sublayers —the MAC layer 217, the Radio Link Control (RLC) layer 218, and the Packet Data Convergence Protocol (PDCP) layer 219.

FIG. 2B is a schematic diagram illustrating a functional split in the physical layers between an RRU 252 and a BBU 251 in accordance with an embodiment of the disclosure. Similar to the RRU 202, the RRU 252 receives a RF signal from a UE 150 and converts it to an analog BB signal at block 260. At ADC block 261, the analog BB signal is converted to a digital signal using CPRI encoding. However, instead of sending raw digitized radio signal directly over fiber as performed by RRU 202, the RRU 252 is configured to send processed data to the BBU 251 by removing the CP and performing FFT at block 262, and performing resource block demapping at block 263 before sending the processed signal over the PON to the BBU 251 via ONU 254 using DRoF 270 (i.e., an eCPRI splitting point).

The BBU 251 receives the processed signal via an OLT 253 and performs QAM equalization and processed signal decoding at block 264. At block 265, the BBU 251 performs FEC on the decoded signal and passes the signal from the physical layer onto the next layer comprising the MAC layer 266, the RLC layer 267, and the PDCP layer 268.

Benefits of the various embodiments include a lower equipment cost for TDM-PON and a lower fiber provisioning requirement. The actual data being sent through fiber will be less than that of CPRI because the data rate under CPRI is fixed as if the system is always at peak load. The actual processed data amount can also be load dependent and not send noise, as occurs in CPRI schemes. Further, a multiplexing gain can be achieved with multiple RRUs sharing the same mobile-PON bandwidth.

Figure 3:
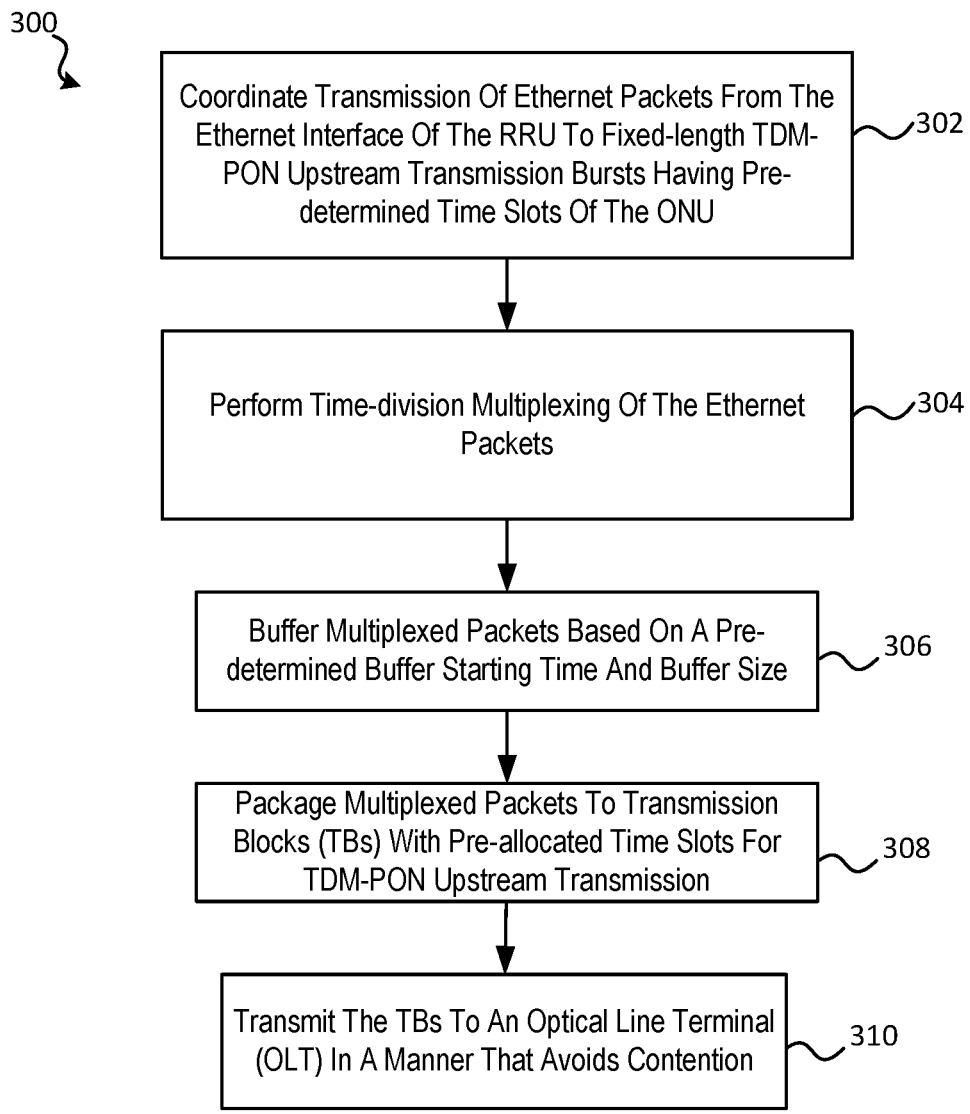
FIG. 3 is a flowchart illustrating an exemplary method for supporting communication between a BBU and a plurality of RRUs via a point-to-multipoint TDM-PON system in accordance with an embodiment of the disclosure.

FIG. 3 is a flowchart illustrating an exemplary method 300 for supporting communication between a BBU and a plurality of RRUs via a point-to-multipoint TDM-PON system in accordance with an embodiment of the disclosure. In one embodiment, the method 300 is performed by an ONU that is communicatively coupled to an RRU via an Ethernet interface such as, but not limited to, eCPRI 110i. The method 300 begins at block 302 by coordinating a transmission of Ethernet packets from the Ethernet interface of the RRU to fixed-length TBs having pre-allocated time slots for TDM-PON upstream transmission of the ONU. In one embodiment, the coordination between the Ethernet interface of an RRU to an ONU is performed by configuring various parameters of an ONU. For example, in various embodiments, coordination between the Ethernet interface of the RRU to the ONU includes configuring a PON's cycle time (Tcycle), a transmission burst rate of an RRU ($R_{RRU}$), and an ONU buffer size as will be further described in FIG. 4.

At block 304, the method 300 performs time-division multiplexing of the Ethernet packets. Time-division multiplexing enables the ONU to transmit and receive independent signals over a common signal path by means of synchronized switches at each end of the transmission line so that each signal appears on the line only a fraction of the time in an alternating pattern. Time-division multiplexing enables the ONU to efficiently use the data rate when the data rate of the transmission medium exceeds the data rate of the signal to be transmitted by the ONU. However, in various embodiments, prior to transmitting the multiplexed Ethernet packets, the method 300, at block 306, buffers the multiplexed Ethernet packets based on a predetermined buffer starting time and buffer size. As will be further described below, the predetermined buffer starting time and buffer size is configured such that the plurality of ONUs minimize the Tgap between Ethernet packets of the ONUs on the transmission line.

At block 308, the method 300 packages the multiplexed packets in the buffer to the fixed length TBs having pre-allocated time slots for TDM-PON upstream transmission. At block 310, the method 300 then is configured to transmit the TBs to an OLT that is communicatively coupled to the BBU in a manner that results in no contention of the TBs occurs at the OLT, with the method 300 terminating thereafter. In one embodiment, contention-free transmission of TBs may be achieved by using a scheduler to assign the time slots for the TBs. In one embodiment, the scheduler takes into consideration the different fiber propagation delays between the ONUs and the OLT so that the TBs arrive at the OLT without overlap (or contention).

Figure 4:
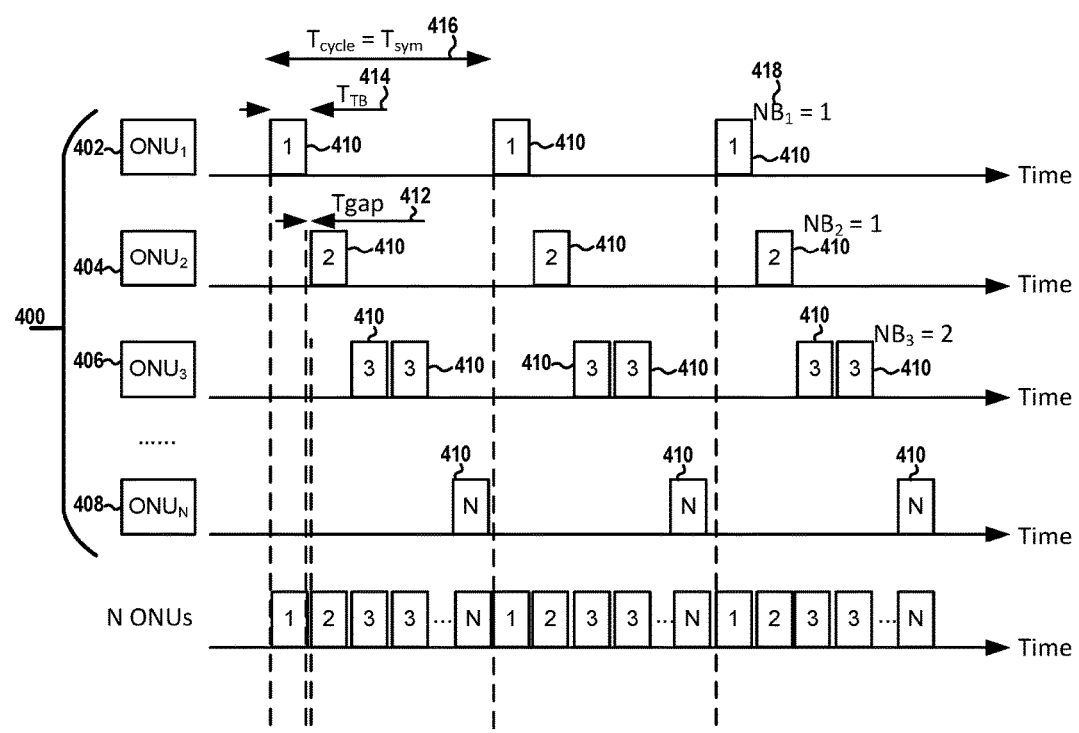
FIG. 4 is a schematic diagram illustrating just-in-time buffering and Ethernet packet coordination between an Ethernet interface and an ONU in accordance with an embodiment of the disclosure.

FIG. 4 is a schematic diagram illustrating just-in-time buffering and Ethernet packet coordination between an Ethernet interface and an ONU in accordance with an embodiment of the disclosure. In the depicted embodiment, a plurality of ONUs 400 ($ONU_1$ 402, $ONU_2$ 404, $ONU_3$ 406, . . . $ONU_n$ 408) coordinate their buffering and packaging of Ethernet packets into TBs 410 to minimize the Tgap 412 between TBs 410 of the ONUs 400. In accordance with an embodiment, each ONU of the plurality of the ONUs 400 are configured to package the Ethernet packets in a number of TBs 410 assigned per transmission burst time ($T_{TB}$) 414 for each $T_{cycle}$ 416 from the multiplexed packets stored in their buffer just-in-time for their assigned $T_{TB}$ 414. For example, in the depicted example, the $ONU_1$ 402 is assigned one TB ($NB_1$=1) 418 as the number of TBs 410 assigned per $T_{TB}$ 414 for $T_{cycle}$ 416. In some embodiments, the TBs 410 are fixed length. In other embodiments, the TBs 410 may have varying lengths. In various embodiments, the just-in-time buffering and Ethernet packet coordination is performed by configuring the Tcycle to be equal to a Tsym of an RRU in a plurality of RRUs corresponding to the plurality of ONUs 400. For example, in some embodiments, the Tcycle may be equal to a largest Tsym of the plurality of RRUs. In one embodiment, the maximum number of bits to be transmitted per Tsym is limited to a number of bits of an ONU TB (NSym) (i.e., corresponding to a rate of $R_{RRU}$). In various embodiments, the Ethernet link (e.g., eCPRI link) between each RRU and ONU may have a rate of m*RRRU, where m is a positive value. In various embodiments, an ONU's net data transfer rate may be configured to be M*$R_{RRU}$, where M is the number of ONU TBs per Tcycle. Additionally, in various embodiments, a buffer of an ONU may be configured to have a pre-determined buffer size that is equal to twice a number of bits of an ONU TB (i.e., 2*NSym) to avoid any buffer overflow and packet drop.

In various embodiments, the order of the Ethernet packets are maintained during time-division multiplexing of the Ethernet packets and while storing of the multiplexed packets in the buffer of the ONU. In various embodiments, time-division multiplexing of the Ethernet packets and buffering of the multiplexed packets is performed without any idle bits between the Ethernet packets. This reduces the buffer size and the amount of data that needs to be stored in the buffer. In some embodiments, the average size of the Ethernet packets is one order of magnitude smaller than a TDM-PON TB size. In some embodiments, the size of the Ethernet packets is equal in size to Ethernet packets of other RRUs in the plurality of RRUs.

As an example, in one embodiment, the $T_{cycle}$=$T_{sym}$=70 microsecond (μs), where $$T_{cycle} = (T_{TB} + T_{gap}) \cdot M, \text{ where } M = \sum_{i=1}^{N} NB_i = 8,$$

$$T_{TB} = 8.5 \text{ μs}, T_{gap} = 0.25 \text{ μs}.$$

In one embodiment, $R_{RRU}$=2.5 Gb/s, and the eCPRI link between each RRU and ONU has a rate of 4*$R_{RRU}$ or 10 Gb/s. In one embodiment, the ONU supports up to M=8 RRUs, and has a net speed of M*$R_{RRU}$ or 20 Gb/s. In one embodiment, the ONU buffer size is 2*$N_{TB}$=2*$N_{sym}$ (=2*2.5 Gb/s*70 μs=350,000 bits). In this example, the buffering latency with respect to each RRU symbol's ending time will be limited to at most one $T_{cycle}$, as to be shown later. In one embodiment, for 25 Gb/s TDM-PON with 20 Gb/s net payload data rate, each TDM-PON burst contains up to 170,000 bits. For a typical eCPRI packet size of up to approximately 16,000 bits, there will be at least approximately 10 eCPRI packets to be aggregated (by the MUX) at each ONU's buffer and MUX module.

Figure 5A:
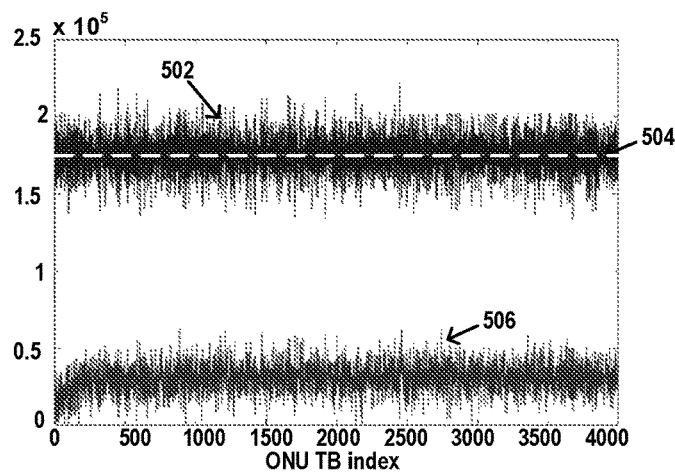
FIGS. 5A-5C are graphs illustrating a number of bits in the ONU buffer in comparison with the ONU TB index using various Tsym settings in accordance with an embodiment of the disclosure.
Figure 5B:
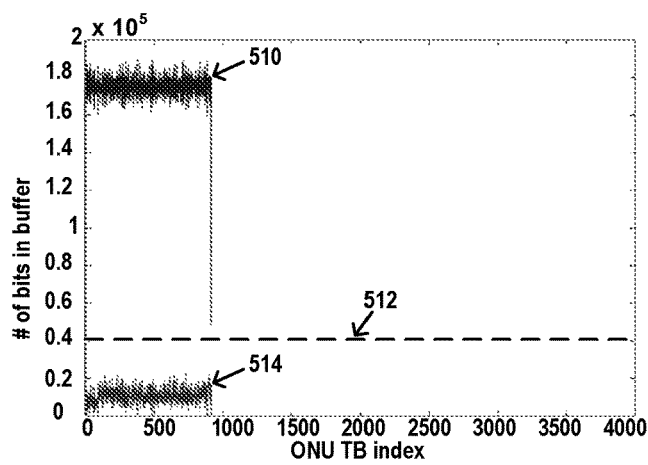
Figure 5C:
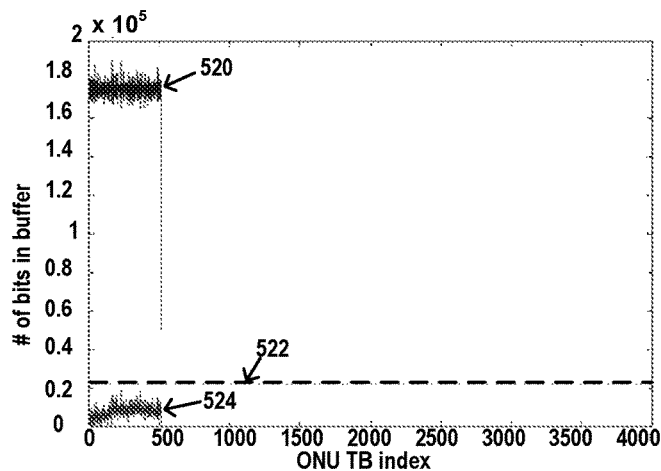

FIGS. 5A-5C are simulation graphs illustrating a number of bits in the ONU buffer in comparison with the ONU TB index using various parameter configurations in accordance with an embodiment of the disclosure. FIG. 5A is a graph depicting a number of bits in the ONU buffer after clearing a current TB, where there are 8 ONUs per OLT. In the depicted embodiment, the RRU $T_{sym}$ is configured to be equal to 70 μs. The Mean $R_{RRU}$ equals 2.5 Gb/s and the number of bits per RRU Tsym is 175,000. The ONU $T_{cycle}$ is equal to 70 μs, the $R_{ONU}$ equals 20 Gb/s, and the number of bits per ONU TB is also 175,000. The portion 502 of the FIG. 5A illustrates the number of bits per ONU TB. Dash line 504 indicates the number of bits per RRU symbol. The portion 506 of the FIG. 5A illustrates the number of bits in the ONU buffer. As depicted in FIG. 5A, there is no risk of buffer overflow based on these configuration settings. Thus, in the depicted embodiment, the buffer size only needs to be 2*$N_{TB}$ or 2*$N_{sym}$, and the buffering latency with respect to each RRU symbol's ending time will be limited to at most one $T_{cycle}$ or 70 μs.

FIG. 5B is a graph depicting a number of bits in the ONU buffer after clearing a current TB, where there are 8 ONUs per OLT. However, in the depicted embodiment, the RRU $T_{sym}$ is configured to be equal to 16 μs. The Mean $R_{RRU}$ equals 2.5 Gb/s and the number of bits per RRU Tsym is 40000. The ONU $T_{cycle}$ is equal to 70 μs, the $R_{ONU}$ equals 20 Gb/s, and the number of bits per ONU TB is 175,000. As depicted in FIG. 5B, there is also no risk of buffer overflow based on these configuration settings. The portion 510 of the FIG. 5B illustrates the number of bits per ONU TB. Dash line 512 indicates the number of bits per RRU symbol. The portion 514 of the FIG. 5B illustrates the number of bits in the ONU buffer. Thus, in the depicted embodiment, the buffer size only needs to be 2*$N_{TB}$, and the buffering latency with respect to each RRU symbol's ending time will be limited to at most one $T_{cycle}$ or 70 μs.

FIG. 5C depicts a graph depicting a number of bits in the ONU buffer after clearing a current TB, where there are 8 ONUs per OLT. However, in the depicted embodiment, the RRU $T_{sym}$ is configured to be equal to 9 μs. The Mean $R_{RRU}$ equals 2.5 Gb/s and the number of bits per RRU Tsym is 22,500. The ONU $T_{cycle}$ is equal to 70 μs, the $R_{ONU}$ equals 20 Gb/s, and the number of bits per ONU TB is 175,000. The portion 520 of FIG. 5C illustrates the number of bits per ONU TB. Dash line 522 indicates the number of bits per RRU symbol. The portion 524 of FIG. 5C illustrates the number of bits in the ONU buffer. As depicted in FIG. 5C, there is also no risk of buffer overflow based on these configuration settings. Thus, in the depicted embodiment, the buffer size also only needs to be $2*N_{TB}$, and the buffering latency with respect to each RRU symbol's ending time will be limited to at most one $T_{cycle}$ or 70 μs.

Figure 6A:
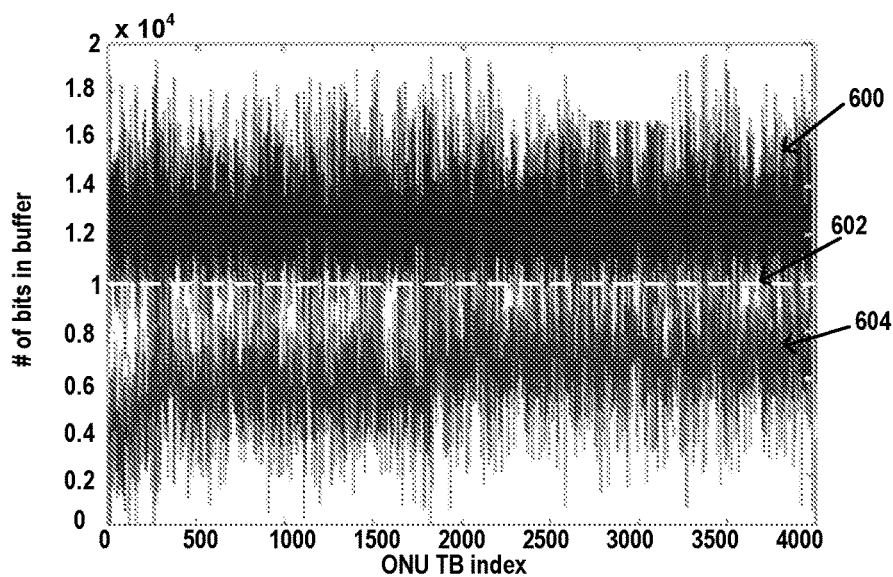
FIGS. 6A-6B are graphs illustrating a number of bits in the ONU buffer in comparison with the ONU TB index using the same Tsym setting with different ONU Tcycle settings in accordance with an embodiment of the disclosure.
Figure 6B:
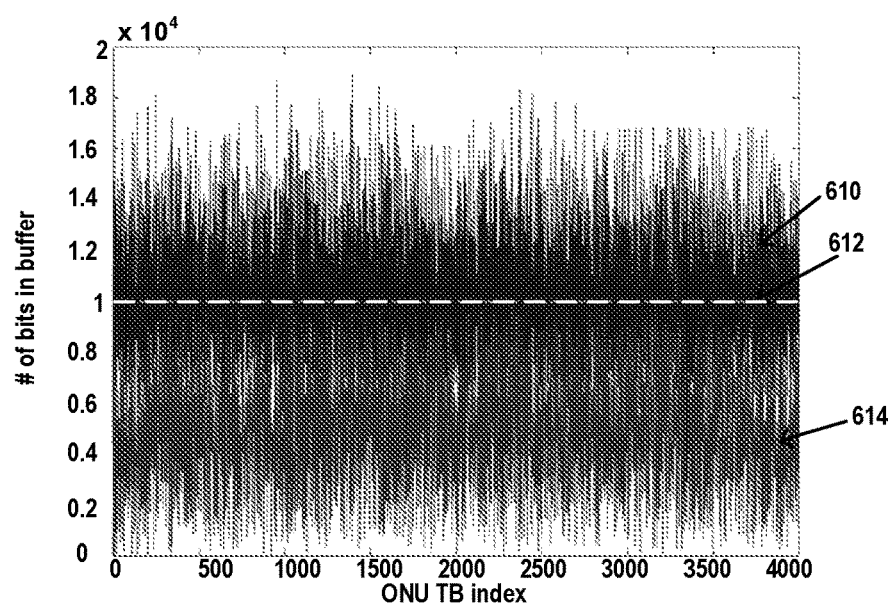

FIGS. 6A-6B are simulation graphs illustrating a number of bits in the ONU buffer in comparison with the ONU TB index using the same Tsym setting with different ONU Tcycle settings in accordance with an embodiment of the disclosure. FIG. 6A is a graph depicting a number of bits in the ONU buffer after clearing a current TB, where there are 8 ONUs per OLT. In the depicted embodiment, the RRU $T_{sym}$ is configured to be equal to 4 μs. The Mean $R_{RRU}$ equals 2.5 Gb/s and the number of bits per RRU Tsym is 10,000. The ONU $T_{cycle}$ is equal to 5 μs, the $R_{ONU}$ equals 20 Gb/s, and the number of bits per ONU TB is also 12,500. The portion 600 of the FIG. 6A illustrates the number of bits per ONU TB. Dash line 602 indicates the number of bits per RRU symbol. The portion 604 of the FIG. 6A illustrates the number of bits in the ONU buffer. As depicted in FIG. 6A, there is a buffer overflow based on these configuration settings as the number of bits in the ONU buffer exceed the number of bits per RRU symbol.

FIG. 6B is a graph depicting a number of bits in the ONU buffer after clearing a current TB, where there are 8 ONUs per OLT. In the depicted embodiment, the RRU $T_{sym}$ is configured to be equal to 4 μs. The Mean $R_{RRU}$ equals 2.5 Gb/s and the number of bits per RRU Tsym is 10,000. The ONU $T_{cycle}$ is equal to 4 μs, the $R_{ONU}$ equals 20 Gb/s, and the number of bits per ONU TB is also 12,500. The portion 610 of the FIG. 6B illustrates the number of bits per ONU TB. Dash line 612 indicates the number of bits per RRU symbol. The portion 614 of the FIG. 6B illustrates the number of bits in the ONU buffer. As depicted in FIG. 6B, there is no buffer overflow based on these configuration settings, as the number of bits in the ONU buffer do not exceed the number of bits per RRU symbol.

The simulation results of FIGS. 6A-B illustrate the contrary of what would be expected finding that it is beneficial to have $T_{cycle}$ equal to $T_{sym}$ to avoid buffer overflow (with a buffer size of $2*N_{TB}$). A larger $T_{cycle}$ actually performs worse. Moreover, smaller $T_{cycle}$ makes the TB shorter and the burst-mode reception harder. Therefore, in accordance with an embodiment, the PON's $T_{cycle}$ is set to the largest $T_{sym}$.

Figure 7A:
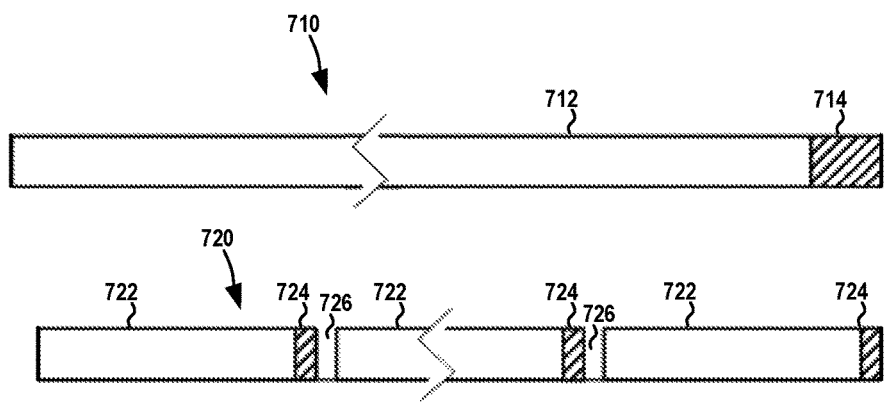
FIG. 7A is a schematic diagram illustrating a first frame structure of an evolved common public radio interface-passive optical network (eCPRI-PON) in accordance with an embodiment of the disclosure.

FIG. 7A is a schematic diagram illustrating a first frame structure of an eCPRI-PON in accordance with an embodiment of the disclosure. FIG. 7A includes a downstream frame 710 and an upstream frame 720. The downstream frame 710 includes a delimiter plus a downstream payload segment 712 that includes FEC parity check bits. A delimiter is one or more characters that separate text strings. A payload is the data contained in the frame. Parity check bits are redundant data, or parity data, added to a message for controlling errors in data transmission over unreliable or noisy communication channel. The downstream frame 710 also includes a frame header 714 that contains the destination and source addresses.

The upstream frame 720 also includes a delimiter plus an upstream payload segment 722 that includes FEC parity check bits. As depicted, the upstream frame 720 may include multiple upstream payload segments 722. The upstream payload segments 722 each include a preamble 724. Generally, Ethernet packets start with a seven-octet preamble and one-octet start frame delimiter. The upstream frame 720 includes a guard space 726 between each upstream payload segment 722.

As an example implementation, in the one embodiment, the frame length for the downstream frame 710 and the upstream frame 720 is 40 μs, which equals 1 megabyte (Mb)/frame at 25 Gb/s. The FEC Reed Solomon (RS) (216, 248) codeword equals 1984 b, which is approximately 79.36 ns. Thus, there is approximately 500 codewords per frame. The total overhead time equals 2 codewords, which equals 3968 bits. The guard space equals 53.76 ns (1344 bits). The preamble 102.4 ns (2560 bits) and the delimiter is 2.56 ns (64 bits). The efficiency equals 216/248*(500−2*8)/500, which equals 84.3% (assuming 8 ONUs). The net payload rate equals 25G*84.3%, which equals 21 Gb/s. The downstream frame header equals 1 codeword >64 b sync+64 b SFC+40*(8 b ID, 16 b start, 16 b stop). Here, downstream efficiency is 216/248*(500−1)/500, which equals 86.9%, which is slightly higher than at of the upstream.

Figure 7B:
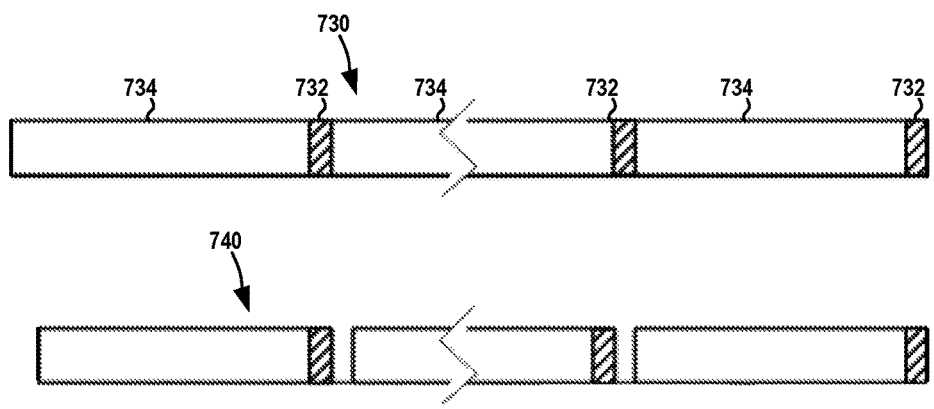
FIG. 7B is a schematic diagram illustrating a second frame structure of an eCPRI-PON in accordance with an embodiment of the disclosure.

FIG. 7B is a schematic diagram illustrating a second frame structure of an eCPRI-PON in accordance with an embodiment of the disclosure. FIG. 7B includes a downstream frame 730 and an upstream frame 740. The upstream frame 740 is similar to the upstream frame 720 of FIG. 7A. However, in this embodiment, the downstream frame 730 includes a multiple downstream payload segment 734. The downstream payload segment 734 includes a delimiter, downstream payload, and FEC parity check bits. The downstream frame 730 includes a preamble 732 between each downstream payload segment 734.

An advantage of the above embodiment includes, but is not limited to, simplifying digital signal processing (DSP) implementation because data recoveries in both upstream and downstream are similar. For example, in some embodiments, the same FEC and data recovery method may be used. Additionally, each ONU only needs to recover the data destined to it, thus reducing the power consumption at the each ONU. Moreover, the downstream signal does not require guard spaces, and thus, the laser can operate in the continuous mode. Therefore, in certain embodiments, more control and management (C&M) bits may be added in those "guard spaces." Accordingly, in certain embodiments, the downstream efficiency may be the same as the upstream efficiency.

Accordingly, the disclosed embodiments provide a method, an ONU, and a TDM-PON system for supporting communication between a BBU and a plurality of RRUs. As an example embodiment, an ONU comprises a processing means such as a processor for executing instructions for coordinating a transmission of Ethernet packets from an Ethernet interface of an RRU to TBs having pre-allocated time slots for TDM-PON upstream transmission. In various embodiments, the TBs are fixed length. In one embodiment, the ONU includes a multiplexing means such as a multiplexor for performing time-division multiplexing of the Ethernet packets to generate multiplexed packets. The ONU includes a storage means such as memory for storing the multiplexed packets in a buffer based on a pre-determined buffer starting time and buffer size. In one embodiment, the ONU uses the processing mean for packaging the multiplexed packets in the buffer to the TBs having pre-allocated time slots for TDM-PON upstream transmission by the ONU. In one embodiment, the ONU includes a transmitter mean such as a transceiver for transmitting the TBs to an OLT that is communicatively coupled to a BBU such that no contention of TBs occurs at the OLT. In various embodiments, the pre-determined buffer starting time may be set such that at a completion of a first packaged TB, the first packaged TB is transmitted in its pre-allocated time slot with a latency that is smaller than a TDM-PON Tcycle. In various embodiments the Tcycle may be equal to a Tsym of an RRU in the plurality of RRUs. For example, in some embodiments, the Tcycle may be equal to a largest Tsym of the plurality of RRUs. In various embodiments, the pre-determined buffer size may be equal to twice a number of bits of an ONU TB. Additionally, in various embodiments, the maximum number of bits to be transmitted is equal to a number of bits of an ONU TB. In various embodiments, the order of the Ethernet packets are maintained during time-division multiplexing of the Ethernet packets and during storing of the multiplexed packets in the buffer of the ONU. In various embodiments, time-division multiplexing of the Ethernet packets and buffering of the multiplexed packets is performed without any idle bits between the Ethernet packets. In various embodiments, the average size of the Ethernet packets is one order of magnitude smaller than a TDM-PON TB size. In various embodiments, the size of the Ethernet packets is equal in size to Ethernet packets of other RRUs in the plurality of RRUs.

The disclosed embodiments may provide for such advantages as lower equipment cost via TDM-PON, lower fiber provisioning requirement, fast-reacting burst-mode detection of upstream TDM-PON bursts using optical digital signal processing, limiting the total latency due to delay buffering and signal processing (e.g., less than 50 µs), and enabling more TDM-PON bursts per cycle to be allocated to an RRU that has more traffic. Additionally, the actual data being sent through fiber will not only be less than that of CPRI, but also load dependent, whereas the data rate under CPRI is fixed as if the system is always at peak load. Other advantages of the disclosed embodiments may also be recognized by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of communication between a base band unit (BBU) and a plurality of remote radio units (RRUs) via a point-to-multipoint time division multiplexing passive optical network (TDM-PON) system, the method comprising:
    receiving, by an ONU, Ethernet packets from the Ethernet interface of an RRU of the plurality of RRUs;
    performing, by the ONU, time-division multiplexing of the Ethernet packets to generate multiplexed packets;
    storing, by the ONU, in a buffer of the ONU the multiplexed packets based on a pre-determined buffer starting time and buffer size;
    packaging, by the ONU, the multiplexed packets in the buffer to transport blocks (TBs) having pre-allocated time slots for TDM-PON upstream transmission; and
    transmitting, by the ONU, the TBs to an optical line terminal (OLT) that is communicatively coupled to the BBU, the transmitting of the TBs are scheduled to produce no contention of TBs at the OLT.

2. The method of claim 1, further comprising configuring the pre-determined buffer starting time to be set such that at a completion of a first packaged TB, the first packaged TB is transmitted in its pre-allocated time slot with a latency that is smaller than a TDM-PON cycle period ($T_{cycle}$).

3. The method of claim 1, further comprising configuring the pre-determined buffer size to be equal to twice a number of bits of an ONU TB.

4. The method of claim 1, further comprising configuring a TDM-PON $T_{cycle}$ to be equal to an RRU symbol period ($T_{sym}$) of one of the RRU in the plurality of RRUs.

5. The method of claim 1, further comprising configuring a TDM-PON $T_{cycle}$ to be equal to a largest $T_{sym}$ of the plurality of RRUs.

6. The method of claim 1, further comprising configuring a maximum number of bits to be transmitted for each RRU symbol.

7. The method of claim 1, further comprising maintaining an order of the Ethernet packets while performing the time-division multiplexing of the Ethernet packets and the storing of the multiplexed packets in the buffer of the ONU.

8. The method of claim 1, further comprising performing the time-division multiplexing of the Ethernet packets and the storing of the multiplexed packets in the buffer of the ONU without idle bits between the Ethernet packets.

9. The method of claim 1, wherein each TB comprises parity check bits for performing forward-error-correction (FEC).

10. A low latency time division multiplexing-passive optical network (TDM-PON) system comprising:

a plurality of remote radio units (RRUs), each RRU is communicatively coupled to an optical network unit (ONU) via an Ethernet interface, a baseband unit (BBU) communicatively coupled to an optical line terminal (OLT), the OLT of the BBU in communication with each ONU of the plurality of RRUs via an optical communication link, and wherein each ONU of the plurality of RRUs is configured to:

receive Ethernet packets from the Ethernet interface of an RRU;

perform time-division multiplexing of the Ethernet packets to generate multiplexed packets;

store in a buffer of the ONU the multiplexed packets based on a pre-determined buffer starting time and buffer size;

package the multiplexed packets in the buffer to fixed length transport blocks (TBs) having pre-allocated time slots for TDM-PON upstream transmission; and transmit the TBs to an OLT that is communicatively coupled to the BBU, the transmitting of the TBs are scheduled to produce no contention of TBs at the OLT.

11. The low latency TDM-PON system of claim 10, further comprising configuring the pre-determined buffer starting time to be set such that at a completion of a first packaged TB, the first packaged TB is transmitted in its pre-allocated time slot with a latency that is smaller than a TDM-PON cycle period ($T_{cycle}$).

12. The low latency TDM-PON system of claim 10, further comprising configuring the pre-determined buffer size to be equal to twice a number of bits of an ONU TB.

13. The low latency TDM-PON system of claim 10, further comprising configuring a TDM-PON $T_{cycle}$ to be equal to an RRU symbol period ($T_{sym}$) of an RRU in the plurality of RRUs.

14. The low latency TDM-PON system of claim 10, further comprising configuring a TDM-PON $T_{cycle}$ to be equal to a largest $T_{sym}$ of the plurality of RRUs.

15. The low latency TDM-PON system of claim 10, further comprising configuring a maximum number of bits to be transmitted for each RRU symbol.

16. The low latency TDM-PON system of claim 10, further comprising maintaining an order of the Ethernet packets while performing the time-division multiplexing of the Ethernet packets and the storing of the multiplexed packets in the buffer of the ONU.

17. The low latency TDM-PON system of claim 10, further comprising performing the time-division multiplexing of the Ethernet packets and the storing of the multiplexed packets in the buffer of the ONU without idle bits between the Ethernet packets.

18. The low latency TDM-PON system of claim 10, wherein each TB comprises parity check bits for performing forward-error-correction (FEC).

19. The low latency TDM-PON system of claim 10, wherein the TDM-PON rate is at least the sum of the mean payload rates of the Ethernet links that are connected to the ONUs.

20. The low latency TDM-PON system of claim 19, wherein the TDM-PON rate is at least 25 Gb/s.

21. The low latency TDM-PON system of claim 19, wherein the mean payload rate of each Ethernet link is at least 2.5 Gb/s.

* * * * *

UNITED STATES PATENT AND TRADEMARK OFFICE
CERTIFICATE OF CORRECTION

PATENT NO. : 10,009,673 B1
APPLICATION NO. : 15/706487
DATED : June 26, 2018
INVENTOR(S) : Xiang Liu et al.

Page 1 of 1

It is certified that error appears in the above-identified patent and that said Letters Patent is hereby corrected as shown below:

On the Title Page (*) Notice:
Delete second occurrence of "days."

Signed and Sealed this
Twenty-ninth Day of January, 2019

Andrei Iancu
*Director of the United States Patent and Trademark Office*